Patented Dec. 17, 1935

2,024,753

UNITED STATES PATENT OFFICE 2,024,753

FILTER

Jean Zwicky, Beckyngton, Farnham Royal, England, assignor to Zwicky Limited, Slough, England Application September 21, 1933, Serial No. 690,359
In Great Britain September 6, 1933

14 Claims. (Cl. 210—167)

This invention relates to filters. Especially it is concerned with the maintenance of a filter in good working order without frequent overhaul or expert attention. It contemplates, for example, the making of a filter suitable for straining gasoline at a re-fuelling station situated in the wilds; and it includes also constructions of fuel filter suitable for use on vehicles, such as automobiles and aircraft, driven by internal combustion engines.

In one aspect the invention consists in utilizing the difference of pressure on the two sides of the filtering element or strainer to carry over a dead centre a spring which then effects the cleaning of the strainer, for example by moving a piston, of which the strainer may form part, so as vigorously though momentarily to reverse the direction of flow through the strainer.

From another point of view the invention may be said to lie in making the strainer movable under the difference of pressure of the filtered and unfiltered liquid, and utilizing its movement to bring filter cleaning means into operation.

In a fuller development of the invention which makes the filter independent of any associated mechanism save the pump, gravity supply or other means necessary for forwarding the liquid to be filtered through the filter, the power needed for the cleaning operation is drawn from the liquid treated, suitably accumulated for example in a spring, and suddenly discharged in effecting a vigorous cleaning operation at an instant which may be determined by the accumulation of the requisite power, but preferably is determined by the state of the filter element as evidenced by the difference of pressure on its two sides which must steadily increase as the filter becomes more and more choked.

The invention also includes constructions of filter which provide for disposing of matter dislodged from the strainer during cleaning in such a manner that it cannot again be drawn into the stream of liquid under treatment.

By way of example embodiments of the invention are illustrated in the accompanying drawings.

Figure 4 is a part elevation partly in section, and

Figure 5 a plan of a further modification in which the liquid treated re-sets the cleaning means and in so doing provides the power requisite for cleaning.

Figure 6 is an enlarged sectional elevation of part of this modification on the line VI—VI of Figure 5.

Figure 1:
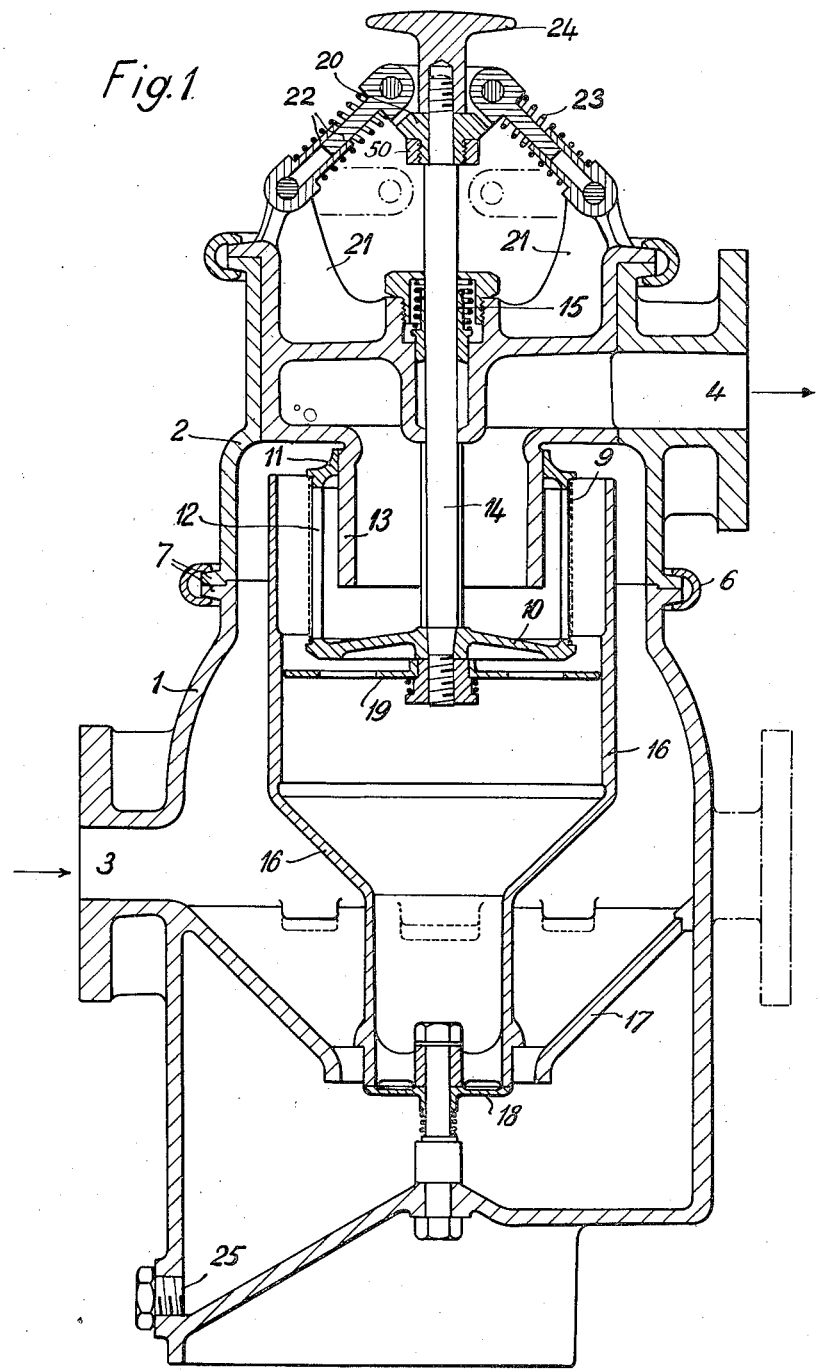
Figure 1 is an axial section of a filter in which the cleaning means is re-set by hand.

The filter casing is conveniently made in two parts 1, 2, of circular cross-section, the one formed with an inlet 3 and the other with an outlet 4; the two parts may be secured together with the inlet and outlet in any desired angular relation, for instance diametrically opposite as shown in full lines in Figure 1 or with the inlet as shown in broken lines on the same side as the outlet. A suitable means of securing the two parts of the body together is a divided channel ring 6 fitting over bevelled flanges 7, the two halves of the channel ring being drawn together by bolts 8.

The filter element or strainer may be built in known manner of sheets of wire gauze 9 wrapped in cylindrical form upon a skeleton consisting of a disc 10 and ring 11 joined by straight bars 12. The ring 11 makes a sliding joint with a cylindrical wall 13 forming part of an end casting closing the upper end of the filter casing; the interior of the cylinder 13 communicates through passages in the end casting with the outlet 4. The filter element or strainer thus forms part of a piston which is fastened on a piston rod 14 projecting through a gland 15 in the end casting. The end casting is fastened to the casing in the same way as the two parts of the casing are fastened together.

The lower part 1 of the casing carries a double funnel 16, 17, the part 17 dividing off the bottom of the casing to form a sheltered sump, while the cylindrical top of the part 16 divides the annular space between the strainer and the casing. The inner funnel 16 is closed at the bottom by a spring-pressed valve 18, and the annular space within it around the strainer is closed by a spring-pressed valve 19 seating upon the disc 10.

To a collar 20 upon the piston rod 14, and to ears 21 upon the end casting of the casing are pivoted the telescoping elements of toggle levers 22 each surrounded and extended by a spring 23.

Figure 3:
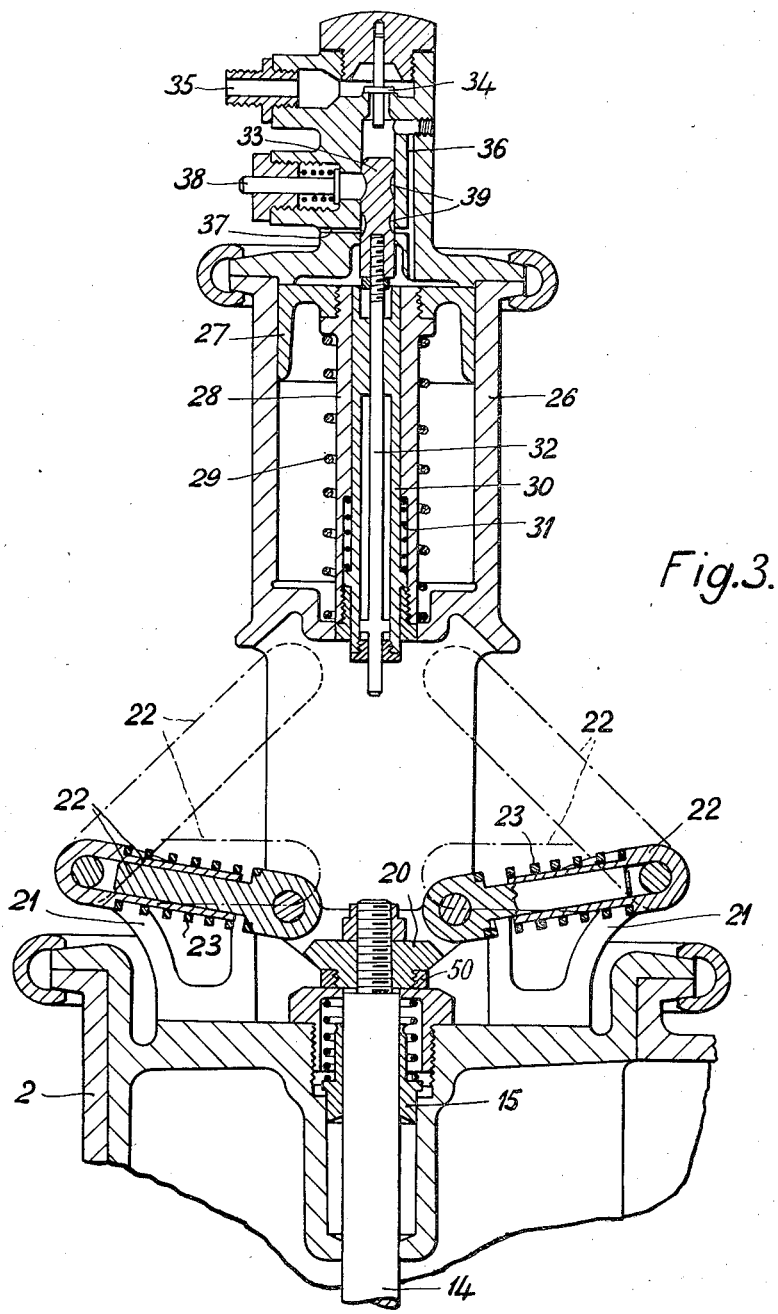
Figure 3 is an enlarged view of the re-setting means of Figure 2 in a different position.

During normal working the toggle levers 22 are in the position shown in Figure 3, and the strainer is lower down than shown in Figure 1, namely with its ring 11 at the bottom of the cylinder 13. Liquid entering at 3 ascends at a reduced speed the annular space around the funnel 16; and any solid matter too heavy to be carried by it at this reduced speed falls into the funnel 17 and through the funnel into the sheltered sump. The liquid then turns downward into the annular space between the strainer and the funnel 16, and passing through the strainer escapes through the outlet 4.

The toggle links 22 being a little below their dead-centre position, as determined by adjustment of the collar 50, the springs 23 exert a slight downward pressure, and this and the weight of the strainer is enough to keep the strainer in its lowermost position, notwithstanding that the pressure of the unfiltered liquid must necessarily exceed the pressure of the filtered liquid by the amount needed to propel the liquid through the strainer. When the strainer is clean this difference is very small; but as the strainer becomes choked by the accumulation of the separated impurities upon the outer surface the difference of pressure on the two sides of the strainer increases, and might, as a limit, approach the maximum pressure which can be exerted by the pump or other means by which the liquid is forwarded through the filter. But as soon as the difference of pressure exceeds the pressure of the toggle and the weight of the moving parts the strainer begins to rise (or, to speak more generally, begins to move towards the outlet, that is to say, so to move as to diminish the volume contained between it and the outlet), and a very short movement carries the toggle past its dead centre. The springs 23 then suddenly expand the toggle links and suddenly lift the strainer to the position shown in Figure 1. This involves a sudden and great diminution of the volume contained between the strainer and the outlet of the filter. As the liquid in and beyond the filter opposes by inertia any sudden acceleration, the greater part of the liquid in the volume swept through by the strainer is not swept forward by the movement of the strainer, but only continues flowing at near its former speed, and therefore is forced backward through the strainer. The acceleration of the strainer, and therefore the backward pressure of the liquid upon the strainer, is greatest at the beginning of this cleaning movement; which has the useful consequence that impurities entangled in the strainer are vigorously dislodged from its surface.

Just as inertia of the liquid resists its violent ejection by the moving strainer, so also it prevents the annular valve plate 19 forcing back towards the inlet the liquid contained in the annular space between the strainer and funnel 16. Instead the valve is forced off its seating and the liquid it would have displaced passes through the valve into the lower part of the funnel 16. This flow, together with the continued inflow of liquid into the filter, and coupled with the movement of the strainer, causes, in effect, a fast stream of liquid to sweep over the outer surface of the filter and to carry down through the valve 19 the solid matter dislodged by the initial outward impulse of the liquid in the strainer. When the upward movement of the strainer ceases the valve 19 closes, and so there is no possibility of the displaced solid matter once carried through it being carried back to the strainer surface.

In the simple construction of Figure 1 re-setting of the cleaning means is effected by hand, for which purpose there is a suitable knob 24 provided on the end of the piston rod 14. When this is pushed down the toggle is re-set, and a part of the dirt-laden liquid beneath the valve 19, including all the dirt that has settled, is forced through the valve 18 into the sheltered sump. It may be removed at intervals through a drain 25; or provision may be made for automatically discharging by momentary opening of a discharge cock during re-setting. The toggle links on expanding may close the circuit of an electric bell or other audible or visual signal, as a warning that re-setting is required.

Where the filter is employed in connection with internal combustion engines there is always the suction of the engine, or the pressure of its exhaust gases, or in the case of supercharged engines there is compressed air, available for resetting the cleaning means. In any such case where a source of pneumatic power is available, a construction like that of Figure 2 may be adopted. The construction illustrated is designed to be operated by compressed air. The end casting 13 of the filter casing carries, besides the ears to which the toggle links are pivoted, a pneumatic cylinder 26, within which is a piston 27 with a hollow piston rod 28, surrounded by a spring 29 which presses the piston to the top of the cylinder. Within the hollow piston rod is a plunger 30 having limited travel relatively to the piston rod and pressed downward by a spring 31. Within this plunger and having limited, though more extensive, travel relatively to the plunger is the stem 32 of a release valve 33 which serves also as a push rod. This push rod is for lifting a pneumatic valve 34 contained within the end casting 35 of the cylinder 26, by which compressed air supplied at 35 is admitted through a narrow passage 36 to the cylinder 26 above its piston 27. A transverse passage 37 joining 36 to the open air serves as a release passage; it is obstructed by the valve 33 when in the position shown in Figure 2, but when the valve is moved down so that the spring detent 38 engages in the upper of its two grooves 39, the lower groove completes the release passage 37 as seen in Figure 3.

Figure 2:
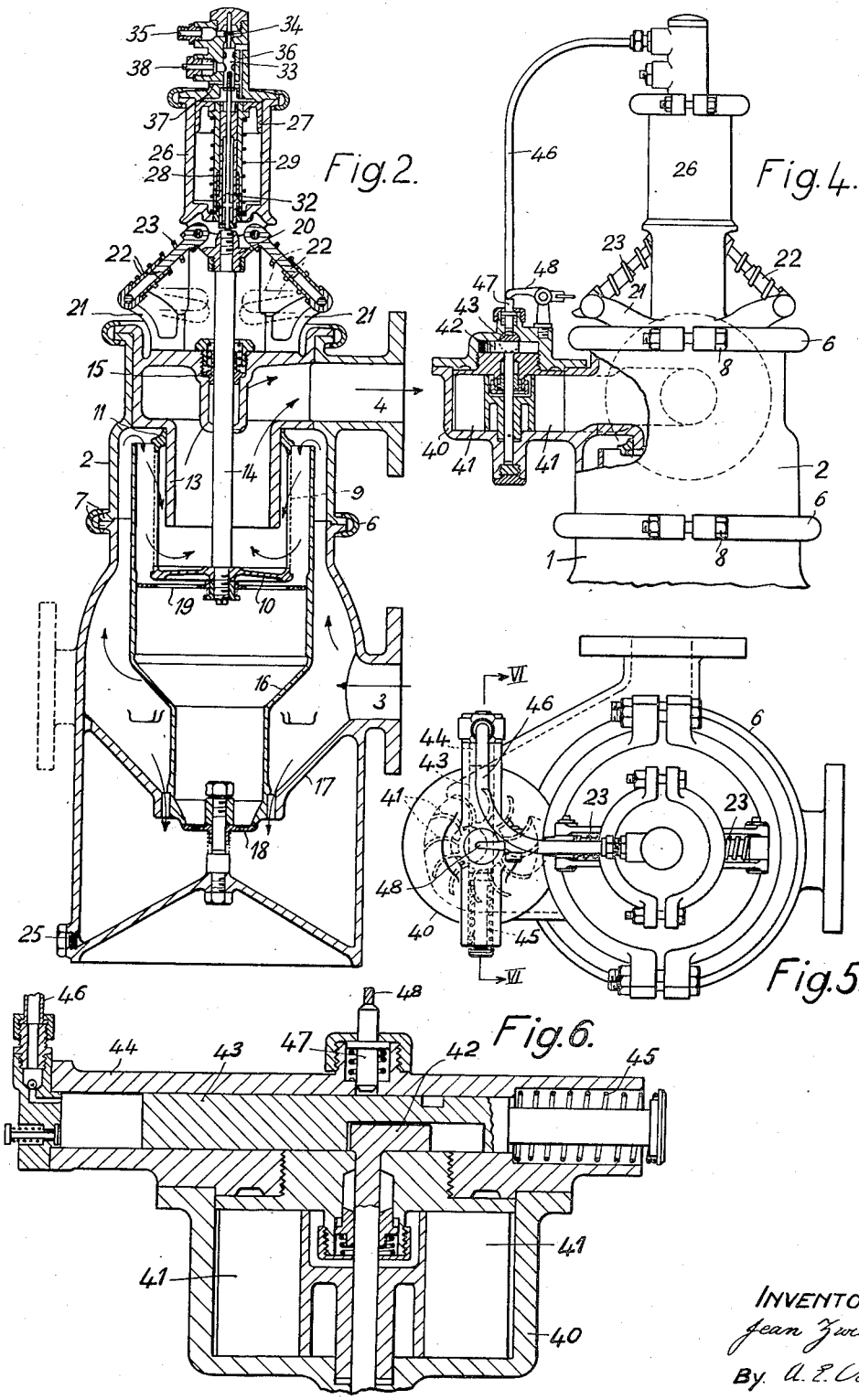
Figure 2 is a similar view of a modification suitable for use with internal combustion engines or in other cases where a source of compressed gas or of suction is available, re-setting of the cleaning means being effected pneumatically.

The rod 32 is of such length, and the pneumatic re-setting device so situated with respect to the self-cleaning filter that when the toggle links 22 expand the rod is lifted to the position shown in Figure 2 and there retained by the detent 38. The air admitted through valve 34 and passage 36 presses down the piston 27; the plunger 30 abuts upon the piston rod 14 of the filter, and after some preliminary compression of the spring 31, the continued slow movement of the piston 27 causes the plunger to press down the rod 14 until the toggle links are brought to their dead centre position. Just before this position is reached the plunger completes its limited travel relatively to the valve stem 32, and now encountering the enlargement of that stem draws the stem down notwithstanding the detent 38, and allows the valve 34 to close. But the vertical component of the toggle spring pressure being now negligible the spring 31 acting on the plunger is able to push the toggles past the dead-centre position to their normal position shown in Figure 3. In this final movement the stem 32 is brought to its lower position as seen in Figure 3, and is held there by the detent 38 engaging in the upper groove of the release valve 33. The air above the piston 27 now escapes through passage 37 and the piston is lifted by its return spring 29.

Automatic re-setting may also be achieved without the aid of an extraneous source of pneumatic power, by taking the requisite power from the liquid treated which is necessarily propelled by gravity or other means through the filter. This can be done without appreciably affecting the flow of liquid; for re-setting need only be performed quite slowly, and therefore a very minute power will suffice to re-set a powerful toggle. One mechanism for the purpose is shown in Figures 4 and 5, where for the sake of leaving unaltered the pneumatically operated re-setting means just described, the passing fluid is utilized to drive an air pump. The outlet passage of the filter is modified so that the liquid in its passage from the cylinder 13 to the outlet 4 passes through the casing 40 of a small turbine or water wheel 41, and turns the wheel. Upon the spindle of the wheel is an eccentric 42 which reciprocates a piston 43 in a transverse cylinder 44 against the action of a spring 45, and so pumps air through pipe 46 into the inlet 35 of the re-setting mechanism.

There is no need for the air pump to continue working when the toggle has been re-set, and therefore one toggle lever, in its movement from dead-centre to normal position, is caused through lever 48 to press down against spring action a stop 47 which engages the piston 43 in its end position, and holds it against the action of its return spring 45, so that the water wheel turns idly. As soon as the toggle is released and effects a cleaning operation the stop 47 is lifted and the pump begins working.

What I claim is:—

1. In a filter the combination of a casing having an inlet and outlet, a straining member interposed between said inlet and outlet and movable in the casing, a toggle lever, spring means exerting pressure along said lever, and means connecting said straining member to said toggle so that movement of said straining member towards the outlet carries said toggle over its dead centre and said toggle thereafter presses said straining member vigorously towards the outlet.

2. In a filter the combination of a casing having an inlet and outlet, a straining member making joint with said casing and separating said inlet and outlet and movable in the casing under the difference of pressure on its two sides, a connecting member attached to said straining member, and a spring compressed between an abutment fixed to said casing and a part of said connecting member to which said spring is attached, its axis of pressure being normally nearly at right angles to the path of movement of the said part and a small component of said pressure pressing the straining member towards the outlet, said spring when brought past the right angle position operating through said connecting member to move said straining member towards the inlet.

3. In a filter the combination of a casing having an inlet and outlet, a strainer movable in said casing and making joint with the casing so as to separate the inlet from the outlet, means operating automatically as a result of the difference of pressure on the inlet and outlet sides of the filter exceeding a predetermined value for vigorously displacing said strainer towards the outlet so as to cause a reverse flow through it, and means for restoring the strainer to its initial position.

4. In a filter the combination of a casing having an inlet and outlet, a strainer movable in said casing and making joint with it and separating the inlet from the outlet, automatically released spring means for vigorously displacing said strainer towards the outlet to cause a reversal of flow through it, a pneumatic cylinder, a piston and piston rod moving in said cylinder and adapted to restore the strainer to its initial position, and an admission valve for said cylinder opened by the displacement of the strainer towards the outlet.

5. In a filter the combination of a casing having an inlet and outlet, a strainer movable in said casing and making joint with it and separating the inlet from the outlet, spring means arranged toggle fashion for vigorously displacing said strainer towards the outlet to cause a reversal of flow through it, said toggle resting normally just beyond its dead-centre position, a pneumatic cylinder, a piston and piston rod moving in said cylinder, a spring interposed between said piston rod and said spring means through which spring said piston rod acts to re-set the toggle, and an admission valve for said cylinder opened by the displacement of the strainer towards the outlet.

6. In a filter the combination of a casing having an inlet and outlet, a strainer movable in said casing and making joint with it to separate the inlet from the outlet, spring means arranged toggle fashion and normally resting just beyond dead centre position for vigorously moving said strainer towards the outlet to reverse the flow through it, and means operated by the liquid passing through the filter for slowly restoring said spring means and strainer to their initial position.

7. In a filter the combination of a casing having an inlet and outlet, a strainer movable in said casing and making joint with it to separate the inlet from the outlet, spring means arranged toggle fashion and normally resting just beyond dead-centre position for vigorously moving said strainer towards the outlet to reverse the flow through it, pneumatic means for slowly restoring said spring means and strainer to their initial position, and an air pump driven by the liquid passing through the filter for supplying said pneumatic means.

8. In a filter the combination of a casing having an inlet and outlet, a strainer movable in said casing and making joint with it to separate the inlet from the outlet, spring means arranged toggle fashion and normally resting just beyond dead-centre position for vigorously moving said strainer towards the outlet to reverse the flow through it, pneumatic means for slowly restoring said spring means and strainer to their initial position, an air pump supplying air to said pneumatic means, a turbine driven by the liquid passing through the filter, and means actuated by the displacement of said spring means and strainer for causing said turbine to drive said pump or put said pump out of action.

9. In a filter the combination of a casing having an inlet and outlet, a strainer movable in said casing making joint with one part of it and separating the inlet from the outlet, a division wall in said casing directing liquid along and through said strainer, and a spring-pressed valve closing the space between said division wall and said strainer, said valve opening on movement of said strainer to permit the passage of dirt dislodged from the strainer.

10. In a filter the combination of a casing having an inlet and outlet, a cylindrical strainer making joint with said casing and separating the inlet from the outlet, means for moving said strainer vigorously parallel with its straining surface to cause a reverse flow through it, a cylindrical wall concentric with the straining member, and a valve carried by said strainer normally closing the annular space between said strainer and said wall and yielding to open during the vigorous movement of said strainer.

11. In a filter the combination of a casing having an inlet and outlet, a cylindrical strainer making joint with said casing and separating the inlet from the outlet, means for moving said strainer vigorously parallel with its straining surface to cause a reverse flow through it, a cylindrical wall concentric with the straining member, a valve carried by said strainer normally closing the annular space between said strainer and said wall and yielding to open during the vigorous movement of said strainer, and a second valve separating the space within said annular wall from a sump and yielding to open upon the return movement of said strainer and its valve.

12. In a filter the combination of a casing having an inlet and outlet, a straining member movable in said casing and making joint with it and separating the inlet from the outlet, spring means for vigorously displacing said straining member towards the outlet to cause liquid to pass through it in the reverse direction to the normal flow, and power means set in action by the displacement of said straining member for re-setting said spring means and the straining member.

13. In a filter the combination of a casing having an inlet and outlet, a straining member movable in said casing and making joint with it and separating the inlet from the outlet, spring means for vigourously displacing said straining member towards the outlet to cause liquid to pass through it in the reverse direction to the normal flow, and power means driven by the liquid passing through the filter and set in action by the displacement of said straining member for resetting said spring means and the straining member.

14. In a filter the combination of a casing having an inlet and outlet, a straining member movable in said casing and making joint with it and separating the inlet from the outlet, spring means brought into action by increase in the pressure difference between the inlet and outlet sides of the filter for vigourously displacing said straining member towards the outlet to cause liquid to pass through it in the reverse direction to the normal flow, and power means set in action by the displacement of said straining member for resetting said spring means and the straining member.

JEAN ZWICKY.